United States Patent
Bae et al.

(10) Patent No.: US 7,417,997 B2
(45) Date of Patent: Aug. 26, 2008

(54) METHOD FOR COMMUNICATION IN COORDINATOR-BASED WIRELESS NETWORK AND METHOD FOR COMMUNICATION BETWEEN COORDINATOR-BASED WIRELESS NETWORKS CONNECTED THROUGH BACKBONE NETWORK

(75) Inventors: Dae-gyu Bae, Suwon-si (KR); Hyun-ah Sung, Seoul (KR); Jin-woo Hong, Suwon-si (KR); In-hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 11/136,674

(22) Filed: May 25, 2005

(65) Prior Publication Data

US 2005/0265372 A1 Dec. 1, 2005

(30) Foreign Application Priority Data

May 25, 2004 (KR) .................. 10-2004-0037485

(51) Int. Cl.
*H04L 12/28* (2006.01)
*H04L 12/56* (2006.01)

(52) U.S. Cl. ............... 370/401; 370/310.2; 370/312; 370/329; 370/338; 370/349; 370/395.5; 370/466

(58) Field of Classification Search ............ 370/401, 370/310.2, 312, 320, 328, 338, 341, 348, 370/349, 351, 389, 392, 395.21, 395.5, 466, 370/467, 329, 336

See application file for complete search history.

(56) References Cited

U.S. PATENT DOCUMENTS

| | | | | |
|---|---|---|---|---|
| 5,220,562 A | * | 6/1993 | Takada et al. | 370/404 |
| 6,879,574 B2 | * | 4/2005 | Naghian et al. | 370/338 |
| 6,925,064 B2 | * | 8/2005 | Hester et al. | 370/255 |
| 6,925,069 B2 | * | 8/2005 | Koos et al. | 370/334 |
| 7,002,938 B2 | * | 2/2006 | Hester et al. | 370/330 |
| 7,016,336 B2 | * | 3/2006 | Sorensen | 370/351 |

(Continued)

FOREIGN PATENT DOCUMENTS

JP 10-308764 A 11/1998

(Continued)

OTHER PUBLICATIONS

"Part 15.3 Wireless Medium Access Control and Physical Layer Specifications for High Rate Wireless Personal Area Networks (WPANs)", IEEE Standard for Information Technology, Sep. 29, 2003, pp. 1-315, XP002342619.

*Primary Examiner*—Matthew Anderson
*Assistant Examiner*—Shaima Q Aminzay
(74) *Attorney, Agent, or Firm*—Sughrue Mion, PLLC (57) ABSTRACT

A method for communication between first and second coordinator-based wireless networks connected through a backbone network is provided. The method includes receiving a frame indicating data transmission containing information needed for remote channel time allocation (CTA) from a repeater connecting the second coordinator-based wireless network with the backbone network, sending a remote CTA frame in order for the repeater to request CTA from the coordinator within the second coordinator-based wireless network, and receiving a data frame originated from the first coordinator-based wireless network and then provided by the repeater during assigned channel time.

14 Claims, 10 Drawing Sheets

U.S. PATENT DOCUMENTS

| | | | |
|---|---|---|---|
| 7,088,702 B2 * | 8/2006 | Shvodian | 370/348 |
| 7,126,926 B1 * | 10/2006 | Bjorklund et al. | 370/328 |
| 2002/0034172 A1 | 3/2002 | Ho | |
| 2003/0016636 A1 * | 1/2003 | Tari et al. | 370/328 |
| 2003/0063619 A1 | 4/2003 | Montano et al. | |
| 2003/0142643 A1 * | 7/2003 | Yang et al. | 370/328 |
| 2003/0149794 A1 | 8/2003 | Morris et al. | |
| 2003/0152059 A1 * | 8/2003 | Odman | 370/338 |
| 2003/0235175 A1 * | 12/2003 | Naghian et al. | 370/338 |
| 2004/0013127 A1 * | 1/2004 | Shvodian | 370/442 |
| 2005/0152305 A1 * | 7/2005 | Ji et al. | 370/328 |
| 2005/0221752 A1 * | 10/2005 | Jamieson et al. | 455/1 |
| 2006/0080460 A1 * | 4/2006 | Kobayashi et al. | 709/238 |

FOREIGN PATENT DOCUMENTS

WO      WO 02/063806  A2      8/2002

* cited by examiner

METHOD FOR COMMUNICATION IN COORDINATOR-BASED WIRELESS NETWORK AND METHOD FOR COMMUNICATION BETWEEN COORDINATOR-BASED WIRELESS NETWORKS CONNECTED THROUGH BACKBONE NETWORK

CROSS-REFERENCE TO RELATED APPLICATION

This application claims priority from Korean Patent Application No. 10-2004-0037485 filed on May 25, 2004 in the Korean Intellectual Property Office, the disclosure of which is incorporated herein by reference in its entirety.

BACKGROUND OF THE INVENTION

1. Field of the Invention

The present invention relates to wireless network communications, and more particularly, to a method for communication in a coordinator-based wireless network environment.

2. Description of the Related Art

With the advancement in communication and network technologies, a wired network environment using wired media such as coaxial or optical cables is evolving into a wireless one using wireless signals in various frequency bands. In line with the transition from wired to wireless technology, a computing device that contains a wireless interface module, enables mobility, and performs specific functions by processing various information ("a wireless network device") is being developed and wireless technologies that enable effective communication between wireless devices on a wireless network are emerging.

There are two major architectures of wireless networks: infrastructure and ad-hoc networks.

Figure 1:
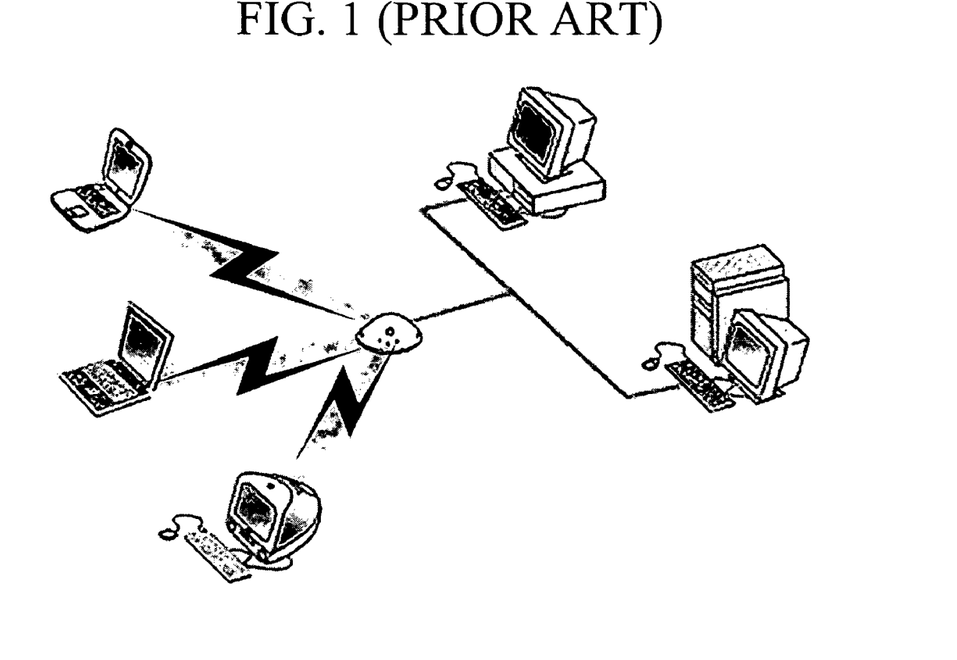
FIG. 1 is an exemplary diagram of a wireless network system operating in an infrastructure mode.
Figure 2:
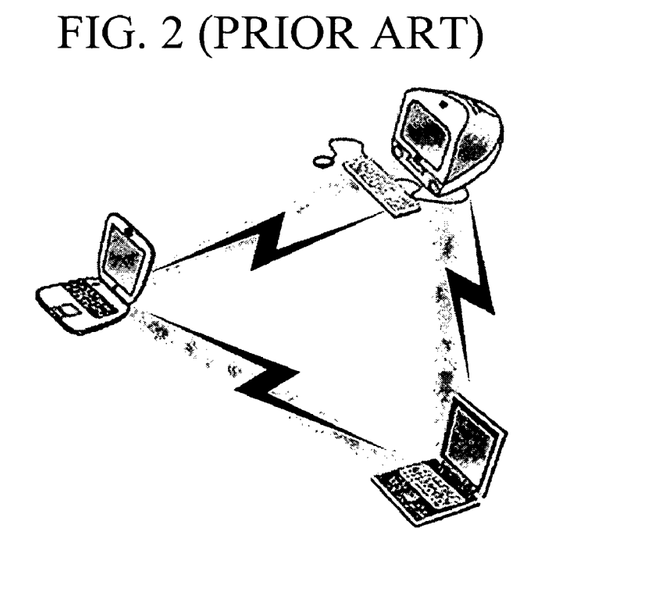
FIG. 2 is an exemplary diagram of a wireless network system operating in an ad-hoc mode.

The infrastructure network contains an access point (AP) as shown in FIG. 1, whereas the ad-hoc network requires no AP for communication as shown in FIG. 2.

In an infrastructure mode, an AP not only has connectivity to the wired network but also provides communication among wireless network devices within a wireless network. Thus, all data traffic in the infrastructure network is relayed through the AP.

In an ad-hoc mode, wireless network devices within a single wireless network can directly communicate with one another without using an AP.

Such wireless networks can be further classified into two types based on the presence of a coordinator. In one type of network, which is called a "coordinator-based wireless network", a randomly selected wireless device acts as a coordinator that assigns channel time to other wireless devices within the same wireless network for data transmission, and then the other wireless devices are allowed to transmit data only at the assigned time. As compared to the coordinator-based wireless network, the other type of network allows all network devices to transmit data at any time desired without using a coordinator.

The coordinator-based wireless network is a single independent coordinator-centered network. When there are multiple coordinator-based wireless networks within a certain area, each network has a unique ID to distinguish itself from others.

Thus, while wireless devices can transmit/receive data to/from other network devices during channel time assigned by the coordinator on a coordinator-based network where they belong, they are not allowed to communicate with wireless devices belonging to another coordinator-based network.

Figure 3:
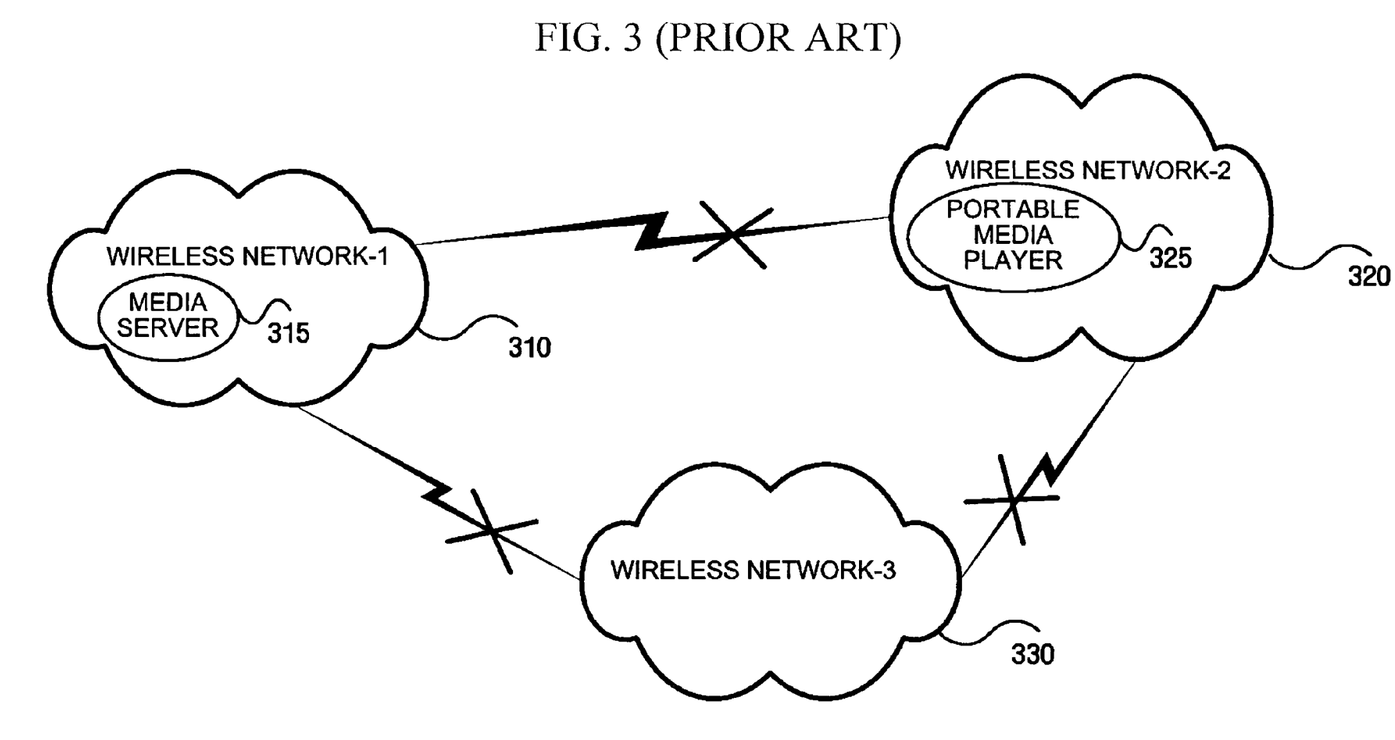
FIG. 3 is an exemplary diagram illustrating communication between conventional coordinator-based wireless networks.

For example, as shown in FIG. 3, in a home network system containing three coordinator-based wireless networks 310, 320, and 330, it is assumed that wireless network-1 310, wireless network-2 320, and wireless network-3 330 are built in a first-floor living room, a second-floor schoolroom, and a first-floor bedroom, respectively.

If a user desires to watch movies stored on a media server 315 in the living room using a portable moving picture player 325 in the schoolroom, then the user cannot watch movies since there is no way to communicate between the wireless network-1 310 and the wireless network-2 320. Accordingly, to see the movies, the user has to go downstairs to the living room.

This problem may arise due to restriction on range of radio waves, absence of information on another coordinator-based wireless network, and channel time allocation.

To achieve data transmission and reception between wireless network devices belonging to different coordinator-based wireless networks, a novel network topology needs to be configured. In particular, there is a need for a method for requesting channel time allocation (CTA) in a coordinator-based wireless network to which a wireless network device that receives data belongs. In Wireless Personal Area Networks (WPANs), which are a representative example of a coordinator-based wireless network and comply with the Institute of Electrical and Electronics Engineers (IEEE) 802.15.3 standard, only a wireless network device that desires to transmit data is allowed to request CTA. That is, no network devices that receive or relay data are able to request CTA since they are unaware of information needed for CTA. The IEEE 802.15.3 proposes standards for a PHY layer corresponding to Physical Layer and a Medium Access Control (MAC) layer making up a Data-Link Layer among the seven layers of the Open System Interconnection (OSI) network model developed by the International Organization for Standardization (ISO) for wireless networks.

Thus, in coordinator-based wireless networks such as WPANs, there is a need for a method that allows a wireless network device receiving data to request channel time allocation (CTA).

SUMMARY OF THE INVENTION

The present invention provides a method that allows a wireless device receiving data to request channel time allocation (CTA).

The present invention also provides a method for communication between coordinator-based wireless networks connected through a backbone network.

The above stated aspects as well as other aspects, features and advantages, of the present invention will become readily apparent from the following description.

According to an aspect of the present invention, there is provided a method for communication in a coordinator-based wireless network including: sending a remote channel time allocation (CTA) request to a sending device in order for the sending device to request CTA from the coordinator within the wireless network for data transmission; and receiving a data frame transmitted by the sending device during assigned channel time.

According to another aspect of the present invention, there is provided a method for communication in a coordinator-based wireless network, the method including receiving a remote channel time allocation (CTA) request frame from a target device, the frame requesting CTA from the coordinator within the wireless network for data reception, requesting CTA from the coordinator according to the remote CTA request, and sending a data frame to the target device during channel time assigned by the coordinator.

According to still another aspect of the present invention, there is provided a method for communication between first and second coordinator-based wireless networks connected through a backbone network, the method including sending a frame indicating data transmission from a sending device in the first coordinator-based wireless network to a repeater connecting the first coordinator-based wireless network with the backbone network in order for a target device within the second coordinator-based wireless network to request remote channel time allocation (CTA), and sending a frame to be destined for the target device from the sending device to the repeater after sending the frame indicating data transmission.

According to a further aspect of the present invention, there is provided a method for communication between first and second coordinator-based wireless networks connected through a backbone network, the method including receiving a frame indicating data transmission containing information needed for remote channel time allocation (CTA) from a repeater connecting the second coordinator-based wireless network with the backbone network, sending a remote CTA frame in order for the repeater to request CTA from the coordinator within the second coordinator-based wireless network, and receiving a data frame originated from the first coordinator-based wireless network and then provided by the repeater during assigned channel time.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which an apparatus and method for requesting channel time allocation (CTA) according to preferred embodiments of the invention are shown. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Meanwhile, for a better understanding of the present invention, a wireless personal area network (WPAN) compliant with the IEEE 802.15.3, and more particularly, a network system for enabling data communication between wireless network devices belonging to different WPANs by connecting multiple WPANs via a wired backbone based on a MAC layer will now be described as an embodiment of a coordinator-based wireless network.

In addition, in a wireless personal area network (WPAN), a wireless network device is called a 'device' and a single network formed by one or more devices is called a 'piconet'. Thus, for consistent use of terms, terms defined in WPAN are hereinafter used throughout this specification.

Figure 4:
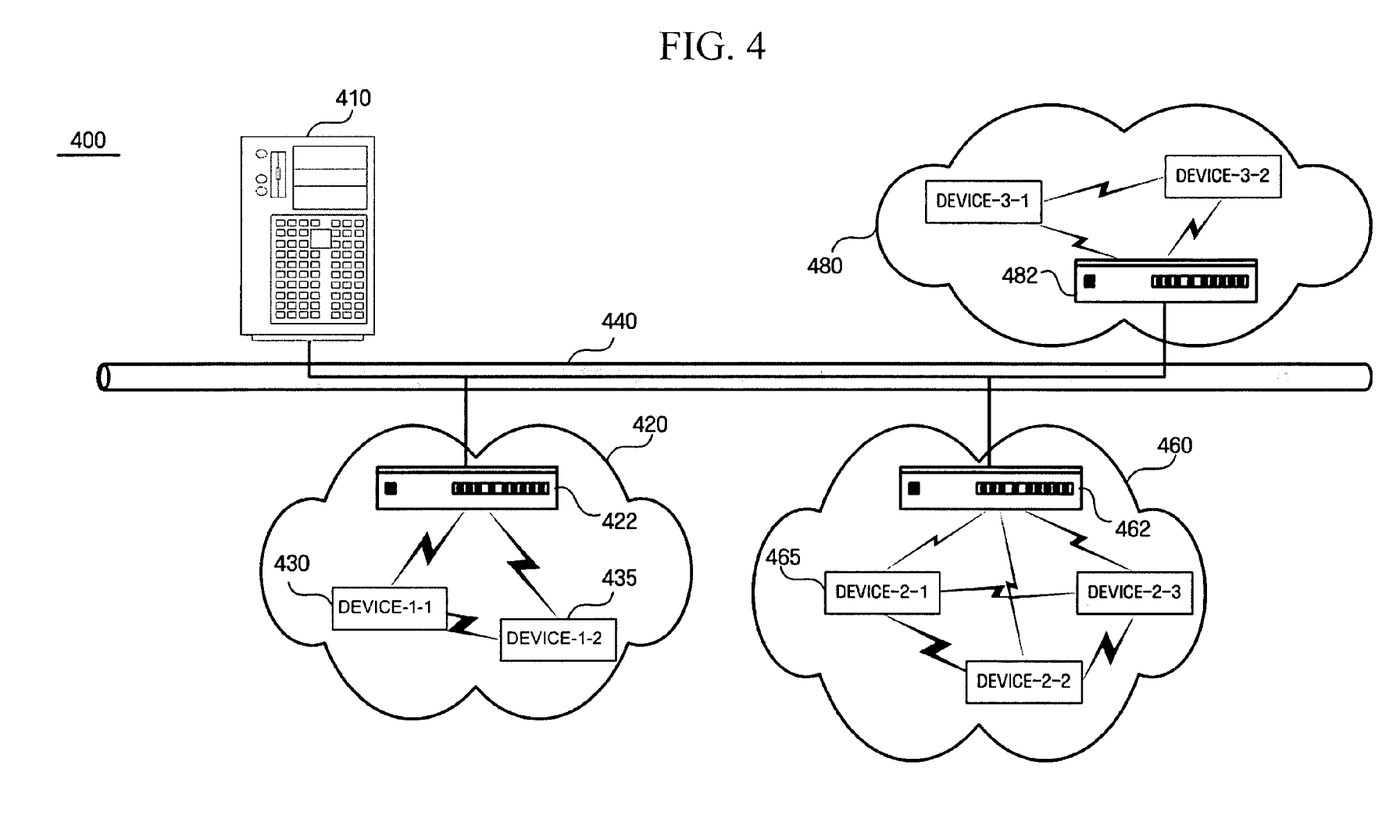
FIG. 4 is an exemplary diagram of a network system according to an embodiment of the present invention.

FIG. 4 is an exemplary diagram of a network system according to an embodiment of the present invention.

Referring to FIG. 4, a network system 400 according to an embodiment of the present invention includes a plurality of piconets 420, 460, and 480, a wired network 440 connected to the piconets 420, 460, and 480, and repeaters 422, 462, and 482 that respectively connect the piconets 420, 460, and 480 with the wired network 440. In this case, for clear distinction, the piconets 420, 460, and 480 are hereinafter called first, second, and third piconets 420, 460, and 480, respectively.

Further, a device acting as a coordinator may be selected among devices belonging to each of the first through third piconets 420, 460, and 480. In a Wireless Personal Area Network (WPAN), the device is named a 'Piconet coordinator'. The device is also hereinafter called a 'PNC'.

Similarly, to more clearly distinguish between the repeaters 422, 462, and 482 belonging to the first through third piconets 420, 460, and 480, they are hereinafter referred to as first, second, and third repeaters 422, 462, and 482, respectively.

Each of the first through third repeaters 422, 462, and 482 may include a router, a wired/wireless bridge, a device, or a PNC depending on the type of a network topology. For example, when each of the repeaters 422, 462, and 482 is a wired/wireless bridge, the network system 400 may create an IP subnet such as '192.168.9.x', and each of the first through third piconets 420, 460, and 480 can be identified by its own ID.

The wired network 440 can conform to any wired network protocol based on a communication medium such as coax cable, optical cable, power line, or phone line. The protocol for the wired network 440 may vary depending on a physical environment where the present invention is applied.

According to an embodiment of the present invention, when a device-1_1 430 desires to communicate with a device-1_2 435, i.e., a communication is made with the same piconet, it has only to comply with a conventional IEEE 802.15.3 standard. However, when the device-1_1 430 wishes to communicate with a device-2_1 465 belonging to the second piconet 460, first, the first repeater 422 receives a wireless packet transmitted by the device-1_1 430 and then generates a wired packet with a structure that is capable of transmitting information contained in the wireless packet. This is because a change in the structure of a communication protocol due to the characteristics of a transmission medium may also cause the structure of a packet to change. The wired packet generated by the first repeater 422 is forwarded to the second repeater 462 through the wired network 440. In this case, the first repeater 422 may broadcast or multicast the wired packet to the second repeater 462 or directly transmit the same only to the second repeater 462.

The second repeater 462 converts a frame received from the first repeater 422 into the form of a frame compliant with the IEEE 802.15.3 standard and forwards the frame to the device-2_1 465.

A response to the packet transmitted by the device-1_1 430 can be performed between the device-1_1 430 and the first repeater 422, the first repeater 422 and the second repeater 462, the second repeater 462 and the device-2_1 465, or between the device-1_1 430 and the device-2_1 465.

Figure 5:
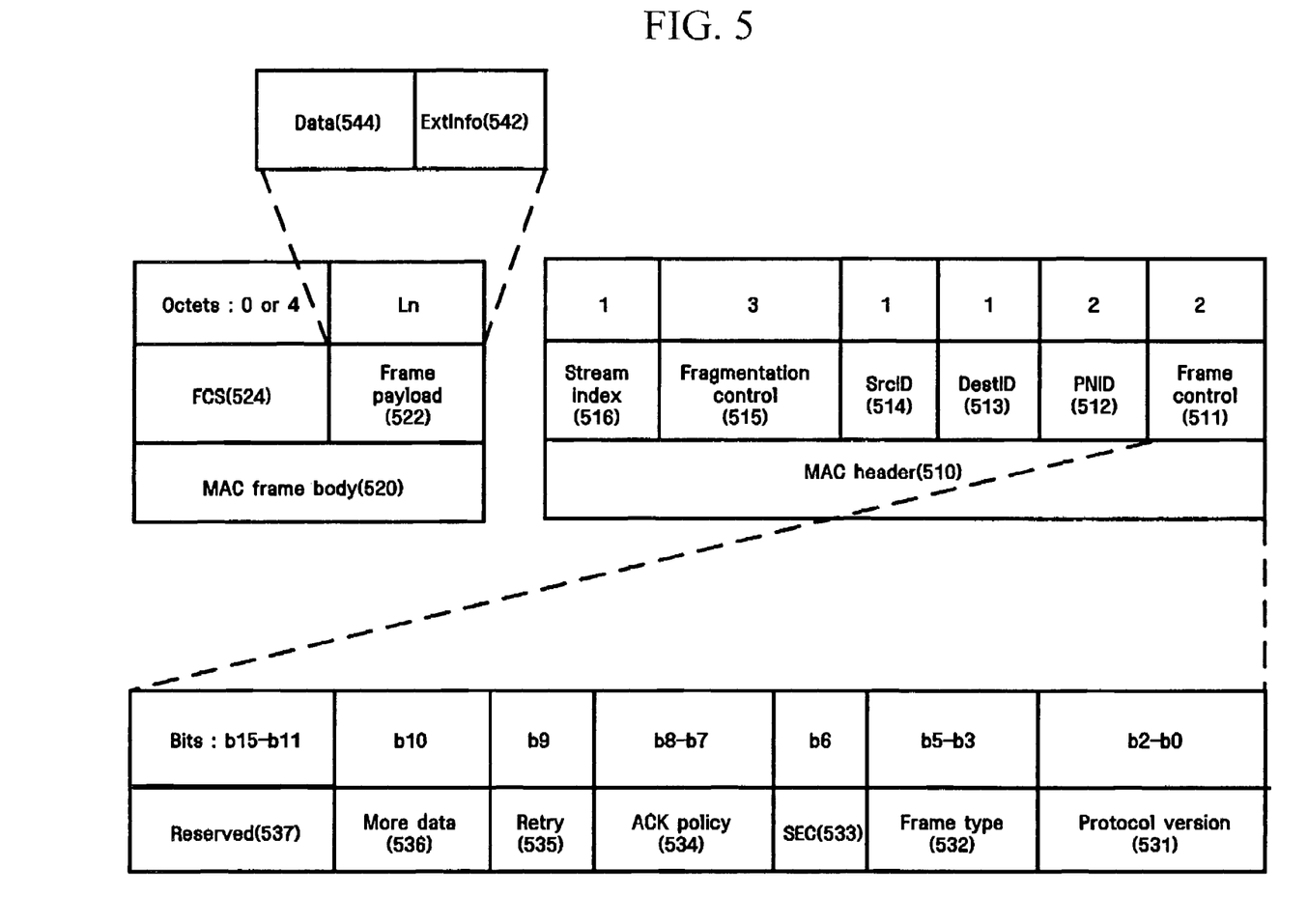
FIG. 5 illustrates the format of a data frame according to an embodiment of the present invention.

FIG. 5 illustrates the format of a data frame according to an embodiment of the present invention.

To realize the present invention, the conventional frame format complaint with the IEEE 802.15.3 standard needs to be modified. The extent of modifications to the frame format may vary according to the type of the first through third repeaters 422, 462, and 482. Thus, the present invention proposes a new frame format when the first through third repeaters 422, 462, and 482 are a wired/wireless bridge. All piconets and wired backbone that have been or will be described later have a single IP subnet. The wired/wireless bridge may act as a device or PNC within a piconet to which the wired/wireless bridge belongs.

Referring to FIG. 5 illustrating a modified format of a MAC frame defined in the IEEE 802.15.3 according to an embodiment of the present invention, in particular, the frame contains newly created 'ExtInfo' field 542 of a frame body 522 and a 'Reserved' area 537 of a 'frame control' information field 511 in a header 510. Important information fields will now be described in brief.

A Medium Access Control (MAC) frame mainly consists of a header 510 containing various information of the MAC frame and a frame body 520. The frame body 520 contains a payload 522 carrying protocol data unit (PDU) from a layer above a MAC layer in a protocol suite conforming to the IEEE 802.15.3 and a Frame Check Sum (FCS) information field 524 that indicates an error in transmission of a frame. For example, when the upper layer is an application layer, application data may be carried in the payload 522.

In addition, the header 510 contains a 'piconet identifier' ('PNID') field 512 specifying an identifier able to identify an appropriate piconet, a 'SrcID' field 514 identifying a source device that transmits the MAC frame, and a 'DestID' field 513 identifying a destination device that receives the MAC frame. The header 510 also contains a 'fragmentation control' field 515 and a 'stream index' field 516.

A currently known IEEE 802.15.3-compliant wireless communication scheme allows communication only between devices within the same piconet identified by the 'PNID' information field 514.

Thus, to enable communication between devices belonging to different piconets, additional information other than the 'PNID' field 512 specifying a piconet ID is needed.

Referring to FIG. 5, the frame body 520 contains the 'ExtInfo' field 542 that will be used for extended communication with a different piconet connected through a wired network. In one embodiment, the ExtInfo field 542 specifies an ID of the different piconet. In this case, all piconets connected through a backbone network must have their unique IDs to distinguish themselves, and each piconet ID can be kept unique through periodic communication among PNCs or by each wired/wireless bridge. In another embodiment, the ExtInfo field 542 may specify unique identifiers such as MAC addresses able to identify a source device and a destination device.

Each wired/wireless bridge needs to know whether a frame received on a piconet where it belongs is destined for a device within same or different piconet. Of course, by specifying a predetermined value such as '0xFFFF' in the 'PNID' field 512, it is possible to notify the wired/wireless bridge that the frame is destined for a device within a different piconet. In this case, the wired/wireless bridge obtains source and destination information from the ExtInfo field 542. However, it is more desirable to indirectly indicate communication between different piconets than using the PNID field 512 in the MAC header 510 of IEEE 802.15.3. That is, some or all bits of the 'reserved' field 537 in the 'frame control' field 511 can be used to specify transfer mode information indicating whether a frame is transmitted/received between devices within a single piconet or different piconets. In IEEE 802.15.3, the 'reserved' field 537 is one of subfields contained in the 'frame control' field 511. Referring to FIG. 5, the frame control field 511 consists of the following subfields: a 'protocol version' field 531 indicating the version of a protocol, a 'frame type' field 532 indicating the type of a frame being transmitted, a 'SEC' field 533 specifying whether the frame is encrypted with a key specified by a security ID (SECID), an 'ACK policy' field 534 representing the type of acknowledgement procedure, a 'retry' field 535 indicating a retransmission of an earlier frame, a 'more data' field 536 indicating that the remaining CTA time slots are not used, and a 'reserved' field 537 reserved for future use.

When the reserved field 537 does not contain transfer mode information indicating communication between different piconets, the SrcID field 514 and the DestID field 513 are used to identify source and destination devices as is conventionally done. Conversely, when the reserved field 537 contains the transfer mode information indicating communication between different piconets, the ExtInfo field 542 is used to identify a destination piconet and a destination device.

In one embodiment, a sending device indicates its own ID and an ID of a wired/wireless bridge in a piconet where it belongs in the SrcID field 514 and the DestID field 513 of a frame to be transmitted, respectively. The wired/wireless bridge in the sending piconet that receives the frame obtains information about a destination piconet and a destination device from the ExtInfo field 542 and transmits the frame to the destination piconet. A wired/wireless bridge in the destination piconet that receives the frame indicates its own ID and an ID of the destination device in the SrcID field 514 and the DestID field 513 of the frame, respectively, and forwards the frame to the destination device.

In another embodiment, a sending device may indicate its own ID and an ID of a receiving device in the SrcID field 514 and the DestID field 513 of a frame to be transmitted, respectively. Even if there is another device having the same ID as the DestID indicated in the frame within the same piconet, a wired/wireless bridge in the sending piconet uses transfer mode information contained in the reserved field 537 to know that the destination is a device within another piconet. The wired/wireless bridge that receives the frame transmits the frame to a destination piconet, and a wired/wireless bridge in the destination piconet forwards the frame to a destination device.

Figure 6:
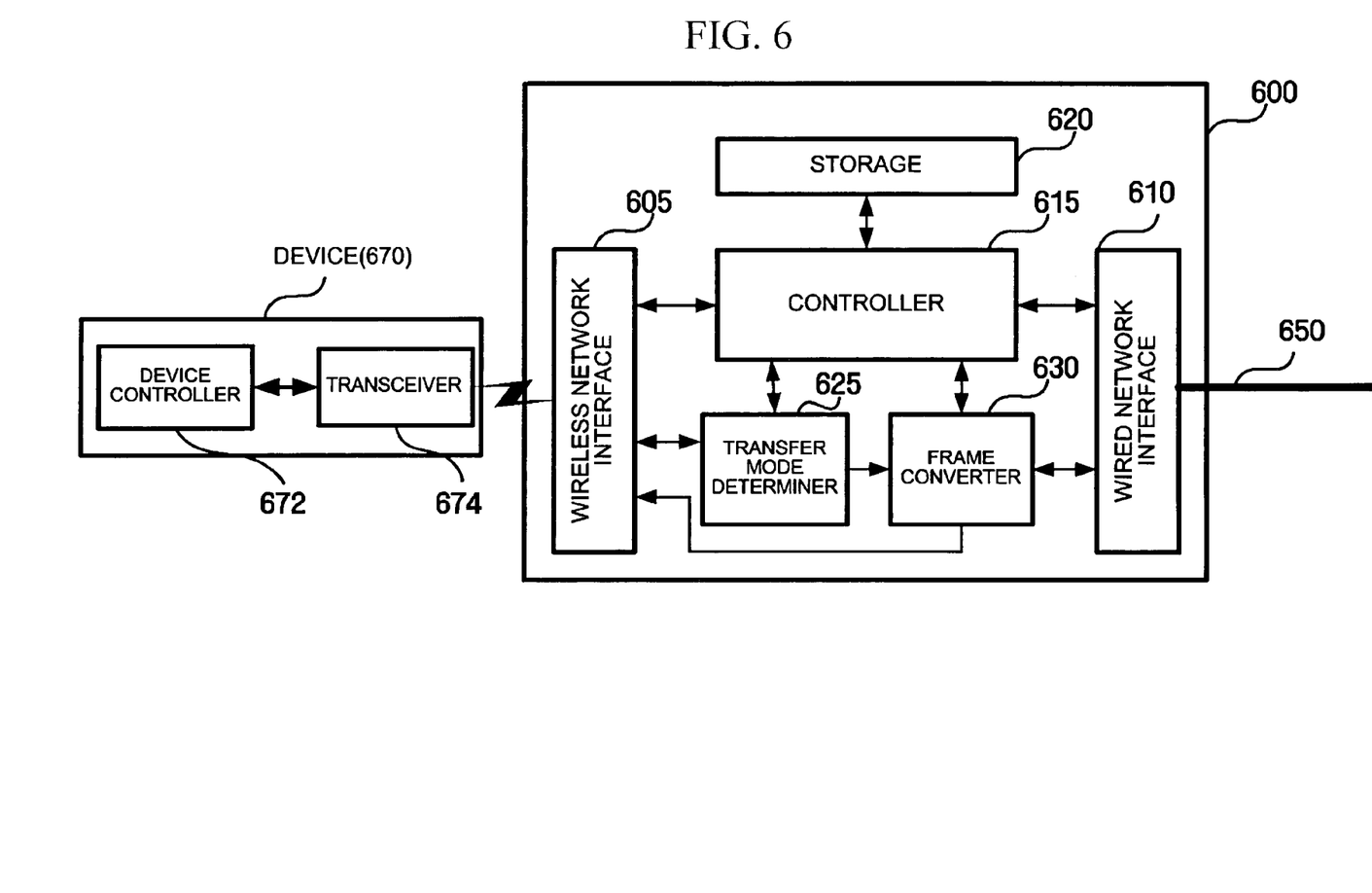
FIG. 6 is an exemplary diagram illustrating the configurations of a device and a wired/wireless bridge according to an embodiment of the present invention.

FIG. 6 is an exemplary diagram illustrating the configurations of a device 670 and a wired/wireless bridge 600 according to an embodiment of the present invention.

The wired/wireless bridge 600 includes a wireless network interface 605 that transmits and receives a frame via a piconet, a wired network interface 610 that is connected to a wired network 650 and transmits and receives a frame, a transfer mode determiner 625 that receives the frame from the wireless network interface 605 and determines a transfer mode using transfer mode information carried in the frame, a frame converter 630 that converts the frame into another frame for transmission to another piconet through the wired network 650, a storage 620 that stores ID information about other piconets connected through the wired network 650 and information about other wired/wireless bridges, and a controller 615 that manages a process occurring among the wireless network interface 605, the wired network interface 610, the transfer mode determiner 625, the frame converter 630, and the storage 620. In this case, the transfer mode determiner 625, the frame converter 630, and the controller 615 may be implemented in a single integrated circuit chip.

The device 670 includes a device controller 672 that generates a frame containing a MAC protocol data unit consisting of a data frame region and an information frame region and a transceiver 674 that sends the generated frame.

The operation of the wired/wireless bridge 600 and the device 670 will now be described in more detail.

For a better understanding of the present invention, reception of a frame from a piconet by the wired/wireless bridge 600 and reception of a frame through the wired network 650 will now be described separately.

1. Reception of a Frame Being Transmitted to a Wireless Medium (1) Communication between Devices within the Same Piconet First, the device controller 672 of the device 670 sets transfer mode information, such as the value of two bits b11 and b12, contained in the 'reserved' field 537 in the 'frame control' field 511 of the header 510 shown in FIG. 5 to '00' while generating a MAC frame. Then, the device controller 672 specifies ID information about a piconet where the device 670 belongs, a destination device (not shown), and the device 670 in the 'PNID' field 512, the 'DestID' field 513, and the 'SrcID' field 514, respectively.

After generating the frame, the transceiver 674 of the device 670 sends the frame to the wired/wireless bridge 600 via a wireless channel. In this case, the wired/wireless bridge 600 receives the frame through the wireless network interface 605. The transfer mode determiner 625 extracts the transfer mode information from the received frame and then discards the frame since the transfer mode information is represented by '00'.

(2) Communication between Devices Belonging to Different Piconets

First, the device controller 672 of the device 670 sets a transfer mode contained in the 'reserved' field 537 of the 'frame control' field 511 to '11' and specifies information identifying a destination device in the ExtInfo field 542.

In one embodiment, the device controller 672 specifies ID information about a piconet where the destination device belongs in the ExtInfo field 542. In this case, the device controller 672 also specifies ID information about the destination device and the device 670 in the 'DestID' field 513 and the 'SrcID' field 514, respectively.

In another embodiment, the device controller 672 may specify unique identifiers such as MAC addresses able to identify the device 670 sending the frame and a destination device in a network in the ExtInfo field 542. In this case, the device controller 672 also specifies ID information about the wired/wireless bridge 600 and the device 670 in the 'DestID' field 513 and the 'SrcID' field 514, respectively.

After generating the frame, the transceiver 674 of the device 670 sends the frame to the wired/wireless bridge 600 via a wireless channel. In this case, the wired/wireless bridge 600 receives the frame through the wireless network interface 605. The transfer mode determiner 625 extracts transfer mode information from the received frame and then transmits the frame to the frame converter 630 since the transfer mode information is represented by '11'. The frame converter 630 then converts the frame to conform to a protocol used to operate the wired network 650. The frame created by the frame converter 630 is transmitted to the wired network 650 through the wired network interface 610. In this case, the frame may be multicast/broadcast or directly transmitted to a wired/wireless bridge in a piconet where the destination device belongs.

2. Reception of a Frame Being Transmitted to a Wired Medium

The wired network interface 610 of the wired/wireless bridge 600 receives a frame from the wired network 650 and transmits the same to the frame converter 630. The frame converter 630 then extracts transfer mode information from the received frame, and when the extracted transfer mode information is represented by '11', checks whether a piconet where the wired/wireless bridge 600 belongs is a destination piconet. When the piconet where the wired/wireless bridge 600 is not the destination piconet, the wired/wireless bridge 600 discards the frame. Conversely, when the piconet where the wired/wireless bridge 600 belongs is the destination piconet, the wired/wireless bridge 600 converts the received frame into a frame conforming to a transmission format of the piconet and then transmits information about a MAC frame contained in the frame to a destination device. More specifically, the frame converter 630 reformats the received frame to conform to a wireless protocol such as a protocol defined in the IEEE 802.15.3 standard. The reformatted frame is sent to the destination device through the wireless network interface 605. Channel time must be allocated for data transmission in the piconet.

Since the IEEE 802.15.3 standard dictates that only a device that desires to send data ('sending device') be allowed to request channel time allocation (CTA), when a device that desires to eventually receive data ('receiving device') belongs to a different piconet than the sending device, a mechanism for performing CTA for data reception is needed. CTA in the receiving device will be explained with reference to FIG. 7.

Figure 7:
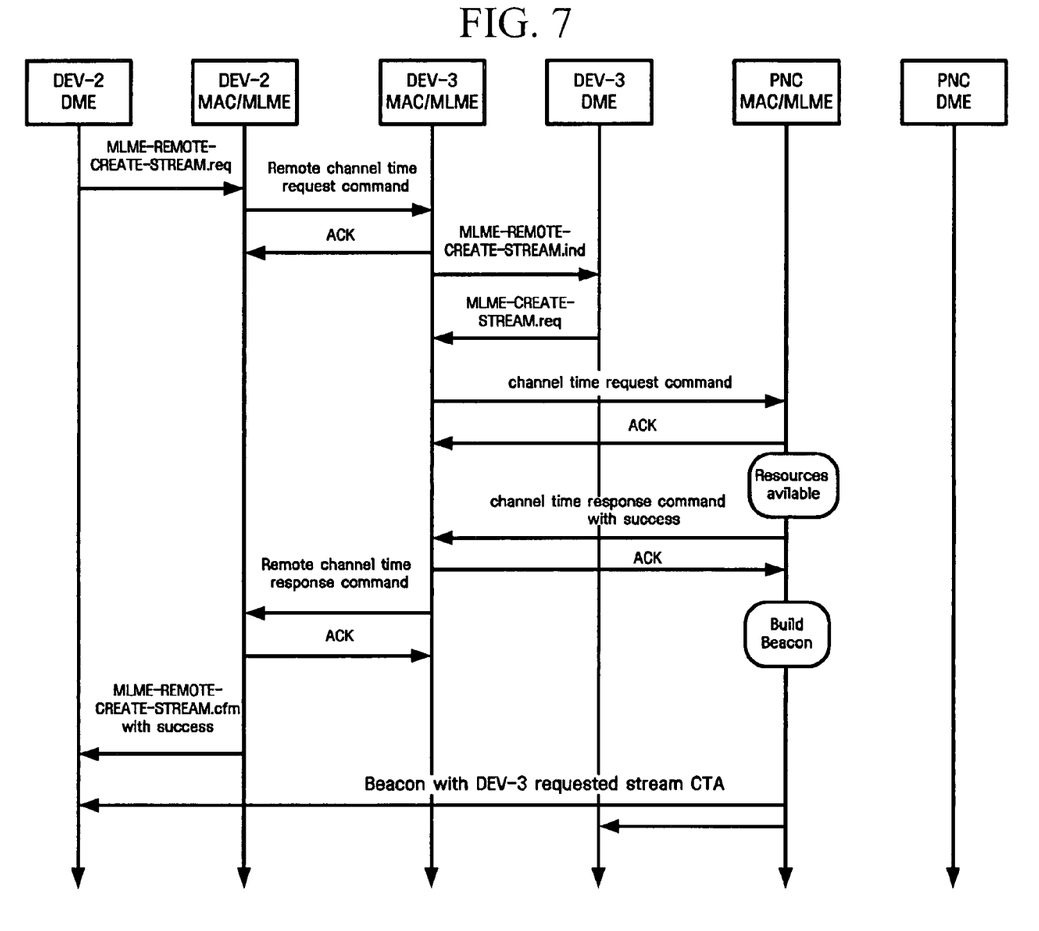
FIG. 7 is an exemplary diagram for explaining a mechanism that enables a receiving party to request channel time allocation (CTA) according to an embodiment of the present invention.

FIG. 7 is an exemplary diagram for explaining a mechanism that enables a receiving party to request channel time allocation (CTA) according to an embodiment of the present invention.

Unless otherwise specified, the process of operation and terms are based on the IEEE 802.15.3 standard. A device is hereinafter abbreviated to 'DEV', and a DEV that desires to send data and a DEV finally receiving data are hereinafter called a 'sending DEV' and a 'target DEV', respectively. In FIG. 7, DEV-2 and DEV-3 are a target DEV and a wired/wireless bridge, respectively.

The DEV-2 that is a target DEV needs to be allocated channel time for reception of a frame. However, the conventional IEEE 802.15.3 standard dictates that only a sending DEV within the same piconet is allowed to request CTA. For communication using a wired/wireless bridge, the wired/wireless bridge is a sending DEV. The present invention provides a method that enables a receiving party to request CTA while maintaining the existing CTA algorithm.

The DEV-2 can be indirectly assigned channel time by the DEV-3 for data reception. That is, the DEV-2 transmits a remote CTA frame to the DEV-3 in order for the DEV-3 to request CTA from a PNC. The DEV-3 that receives the remote CTA frame requests CTA from the PNC. The CTA mechanism will now be described in more detail with reference to FIG. 7.

First, a device management entity (DME) of the DEV-2 invokes a 'MLME-REMOTE-CREATE-STREAM.request' message of its own Medium Access Control (MAC) Layer Management Entity (MLME). In one embodiment, the structure of the 'MLME-REMOTE-CREATE-STREAM.request message' is the same as a conventional MLME-CREATE-STREAM.request message structure compliant with the IEEE 802.15.3 standard:

```
MLME-REMOTE-CREATE-STREAM.request (
TrgtID,
DSPSSetIndex,
StreamRequestID,
StreamIndex,
ACKPolicy,
Priority,
PMCTRqType,
CTAType,
CTARateFactor,
CTRqTU,
MinNumTUs,
DesiredNumTUs,
RequestTimeout
)
```

Parameters contained in the MLME-REMOTE-CREATE-STREAM.request message have the same meaning as their counterparts in the IEEE 802.15.3 MLME-CREATE-STREAM.request message. For example, 'TrgtID' specifies an ID of a target DEV that is the target of MLME request. Other parameters have the same meaning as defined in the conventional IEEE 802.15.3 standard.

The DEV-2 MLME converts the invoked MLME-REMOTE-CREATE-STREAM.request message into a remote channel time request command for transmission to the DEV-3. The format of the remote channel time request command according to an embodiment of the present invention will be described in detail later with reference to FIG. 8.

Upon receipt of the remote channel time request command, a MLME of the DEV-3 transmits an ACK frame to the DEV-2 and issues a MLME-REMOTE-CREATE-STREAM.indication message to notify a DEV-3 DME of the receipt of the remote channel time request command.

The DEV-3 DME that receives the MLME-REMOTE-CREATE-STREAM.indication message requests CTA from the PNC by specifying channel time required for data transmission from the DEV-3 to the DEV-2. More specifically, the DEV-3 DME invokes a MLME-CREATE-STREAM.request message generated by the DEV-3 MLME, and the DEV-3 MLME converts the invoked MLME-CREATE-STREAM.request message into a remote channel time request command for transmission to the PNC.

When a resource is available for allocation, the PNC transmits a channel time response command indicating the CTA is successful to the DEV-3. The operation between the DEV-3 and the PNC described above is performed in the same way as defined in the conventional IEEE 802.15.3.

Upon receipt of the channel time response command indicating the successful CTA, the DEV-3 MLME sends a remote channel time response command indicating the same to the DEV-2. The DEV-2 MLME that receives the remote channel time response command sends a MLME-REMOTE-CREATE-STREAM.cfm message indicating the successful CTA to the DEV-2 DME. In one embodiment, the structure of the 'MLME-REMOTE-CREATE-STREAM.confirm message' is the same as a conventional MLME-CREATE-STREAM.confirm message structure defined the IEEE 802.15.3 standard:

```
MLME-REMOTE-CREATE-STREAM.confirm (
StreamRequestID,
StreamIndex,
AvailableNumTUs,
ReasonCode,
ResultCode
)
```

Parameters contained in the MLME-REMOTE-CREATE-STREAM.request message have the same meaning as their counterparts in the IEEE 802.15.3 MLME-CREATE-STREAM.request message.

Once the CTA is successfully performed, the PNC generates a beacon containing CTA information and broadcasts the beacon to devices within the piconet.

Figure 8:
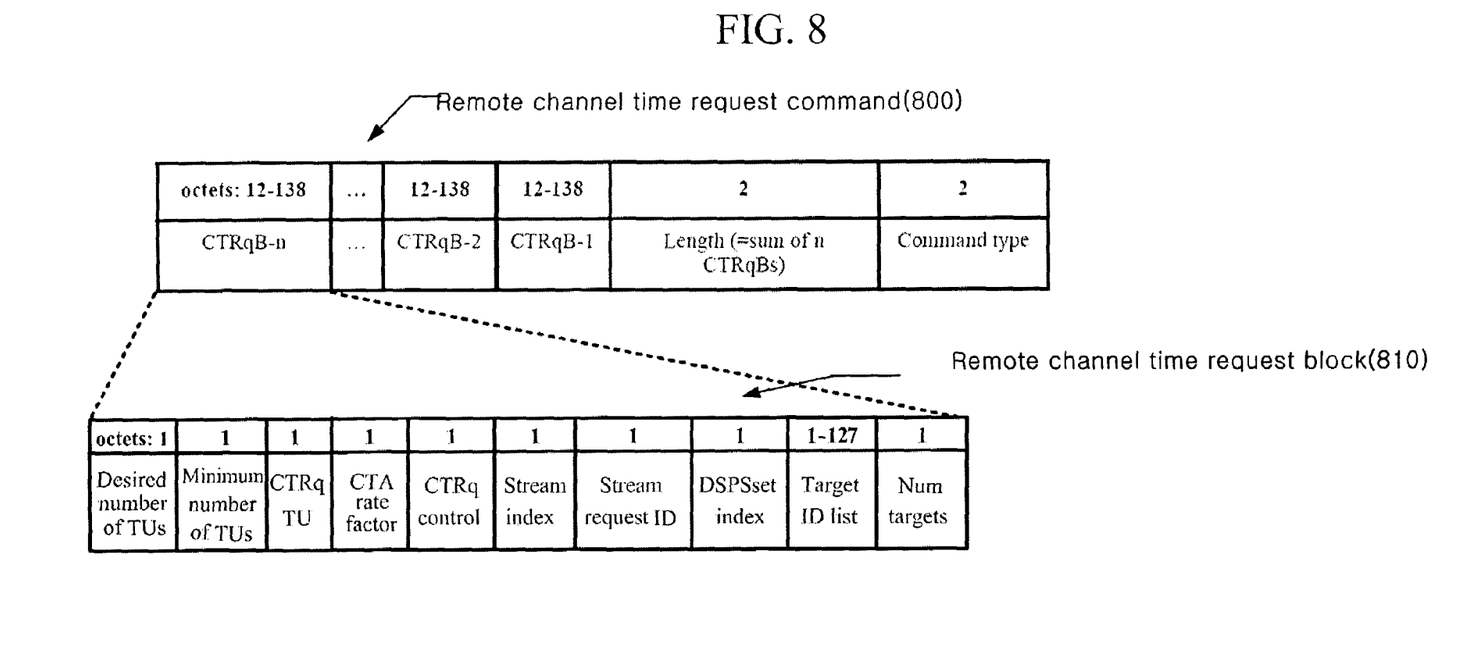
FIG. 8 illustrates the format of a channel time request command according to an embodiment of the present invention.

FIG. 8 illustrates the format of a remote channel time request command 800 according to an embodiment of the present invention.

Referring to FIG. 8, the remote channel time request command 800 is comprised of multiple channel time request blocks 810. The remote channel time request command 800 newly defines a command type to distinguish it from existing command frames. For example, by setting the command type to "0x0021", the remote channel time request command 800 can be distinguished from existing commands. While not shown, the remote channel time response command shown in FIG. 7 also newly defines a command type to distinguish it from existing commands. For example, by setting the command type to "Ox0022", the remote channel time response command can be distinguished from other existing commands.

Each remote channel time request block 810 designates a target DEV with a Target ID. The DEV-3 that receives the remote channel time request command 800 transmits a channel time request command (not shown) having the same format as the remote channel time request command 800 to the PNC.

The PNC that receives the channel time request command checks whether a channel time is available for allocation and transmits the result to the DEV-3 using a channel time response command. When CTA is successfully performed, the DEV-3 transmits the stream to the DEV-2 during the allocated channel time.

As described above with reference to FIGS. 7 and 8, the present invention enables a target DEV to indirectly request CTA through a sending DEV without making a change to the existing IEEE 802.15.3 standard format. Enabling the target DEV to request CTA can be useful for communication between different piconets connected through a backbone network.

Figure 9:
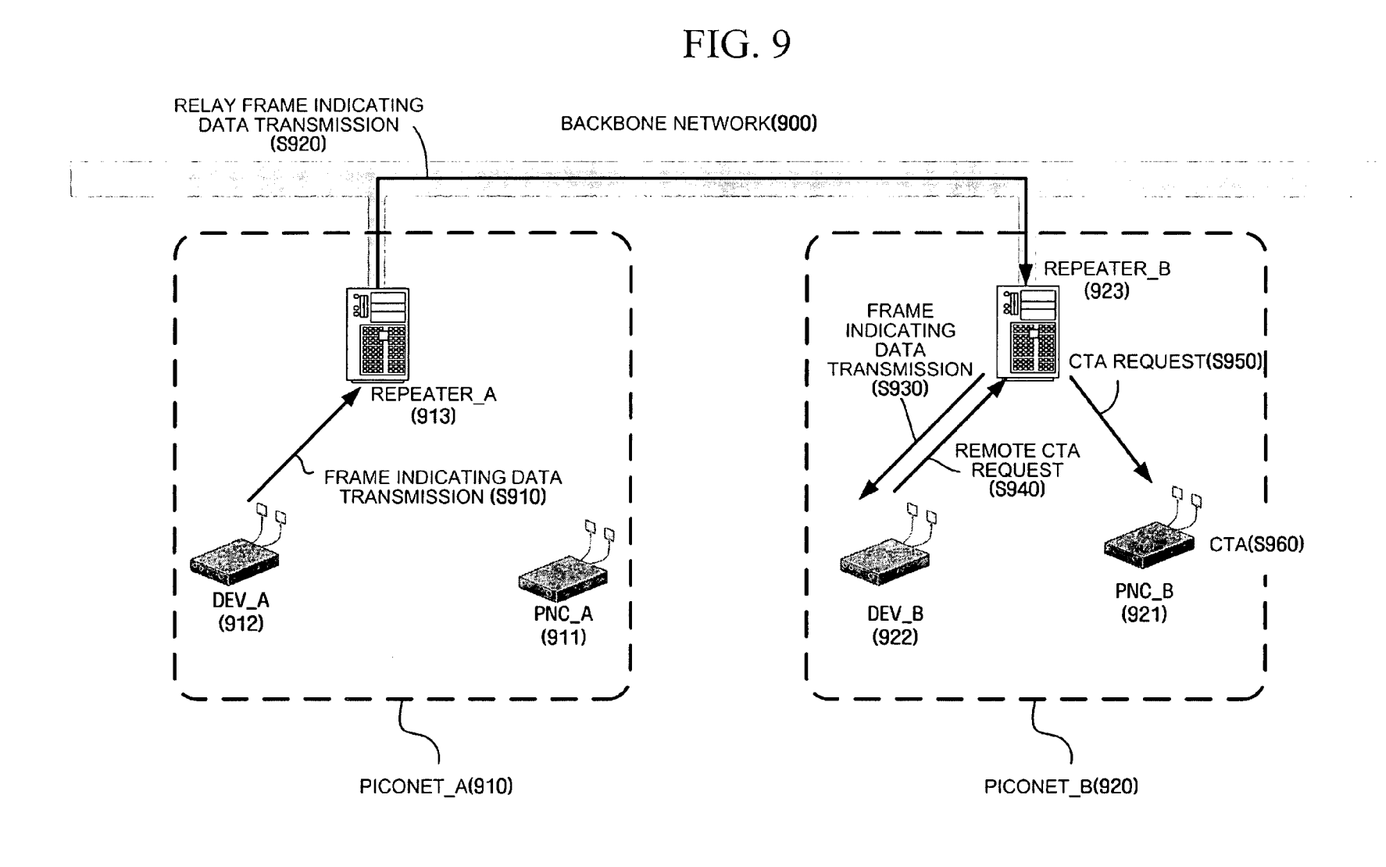
FIG. 9 is an exemplary diagram illustrating a process that allows a receiving party to request CTA in a network system according to an embodiment of the present invention.

FIG. 9 is an exemplary diagram illustrating a process that allows a receiving party to request CTA in a network system according to an embodiment of the present invention.

Referring to FIG. 9, a piconet_A 910 connects to a piconet_B 920 through a backbone network 900. Each piconet has a repeater for relaying data between a backbone network that is a wired network and the piconet that is a wireless network. For example, the piconet_A 910 and the piconet_B 920 respectively contain a repeater_A 913 and a repeater_B 923.

In order to transmit data to DEV_B 922 in the piconet_B 920, DEV_A 912 in the piconet_A 910 first sends the data to the repeater_A 913. The repeater_A 913 then converts the received data into a data format conforming to a backbone network protocol and transmits the resulting data to the repeater_B 923. The repeater_B 923 sends the data to the DEV_B 922. For data transmission in a piconet, a sending DEV requests CTA from a PNC. For example, the DEV_A 912 and the repeater_B 923 can be assigned time slots by respectively requesting CTAs from PNC_A 911 and PNC_B 921.

If the DEV_A 912 intends to send a small amount of non-real-time data to the DEV_B 922, the repeater_B 923 is assigned channel time required to transmit the data stored in a buffer by the PNC_B 921 and then transmits the data to the DEV_B 922 during the assigned channel time. On the other hand, if the DEV_A 912 intends to send a large amount of real-time data such as motion picture data to the DEV_B 922, the repeater_B 923 cannot transmit an appropriate amount of data to the DEV_B 922 at the proper time since it is not able to recognize the characteristics and amount of data to be transmitted by the DEV_A 912.

In this case, as shown in FIG. 9, the DEV_B 922 makes a remote CTA request to the repeater_B 923 so that the repeater_B 923 can be assigned channel time required to transmit data to the DEV_B 922. The detailed process will now be described with reference to FIG. 9.

In step S910, the DEV_A 912 sends a frame indicating data transmission to the DEV_B 922. The frame indicating data transmission is a frame in a layer (e.g., application layer) above an IEEE 802.15.3 MAC layer. After receiving the frame indicating data transmission, the DEV_B 922 becomes aware of channel time required for transmission.

In step S920, the frame indicating data transmission sent by the DEV_A 912 is received by the repeater_A 913 and then relayed to the repeater_B 923. In order to relay the frame to the repeater_B 923, the repeater_A 913 converts the IEEE 802.15.3 frame into a format conforming to the backbone network protocol. Alternatively, the repeater_A 913 may add header information necessary for transmission of a frame over the backbone network 900 to the IEEE 802.15.3 frame for transmission to the repeater_B 923.

In step S930, the repeater_B 923 converts the frame indicating data transmission received through the backbone network 900 back into an IEEE 802.15.3 frame for transmission to the DEV_B 922.

In step 940, the DEV-B 922 receives the frame indicating data transmission and makes a remote CTA request to the repeater_B 923, which allows the repeater_B 923 to request CTA from the PNC_B 921 by specifying channel time required to send data to the DEV_B 922.

In step 950, upon receipt of the remote CTA request, the repeater_B 923 requests CTA from the PNC_B 921. When a resource is available for CTA, the PNC_B 921 assigns channel time required for the repeater_B 923 to send data to the DEV_B 922. Once the channel time is successfully assigned to the repeater_B 923, the PNC_B 921 broadcasts CTA information in addition to a beacon.

In the illustrated embodiment, the repeater_A 913 or the repeater_B 923 may be a wired/wireless bridge that is a member device in a piconet. While the PNC_A 911 and the PNC_B 921 are described to be respectively installed separately from the repeater_A 913 and the repeater_B 923, the former may be incorporated into the latter.

Enabling a target DEV to (remotely) request CTA can be useful for communication between different piconets connected through a backbone network as well as in the same piconet. For example, the target DEV needs to determine channel time to be allocated in order to determine the required data transmission rate and Quality of Service (QoS).

Figure 10:
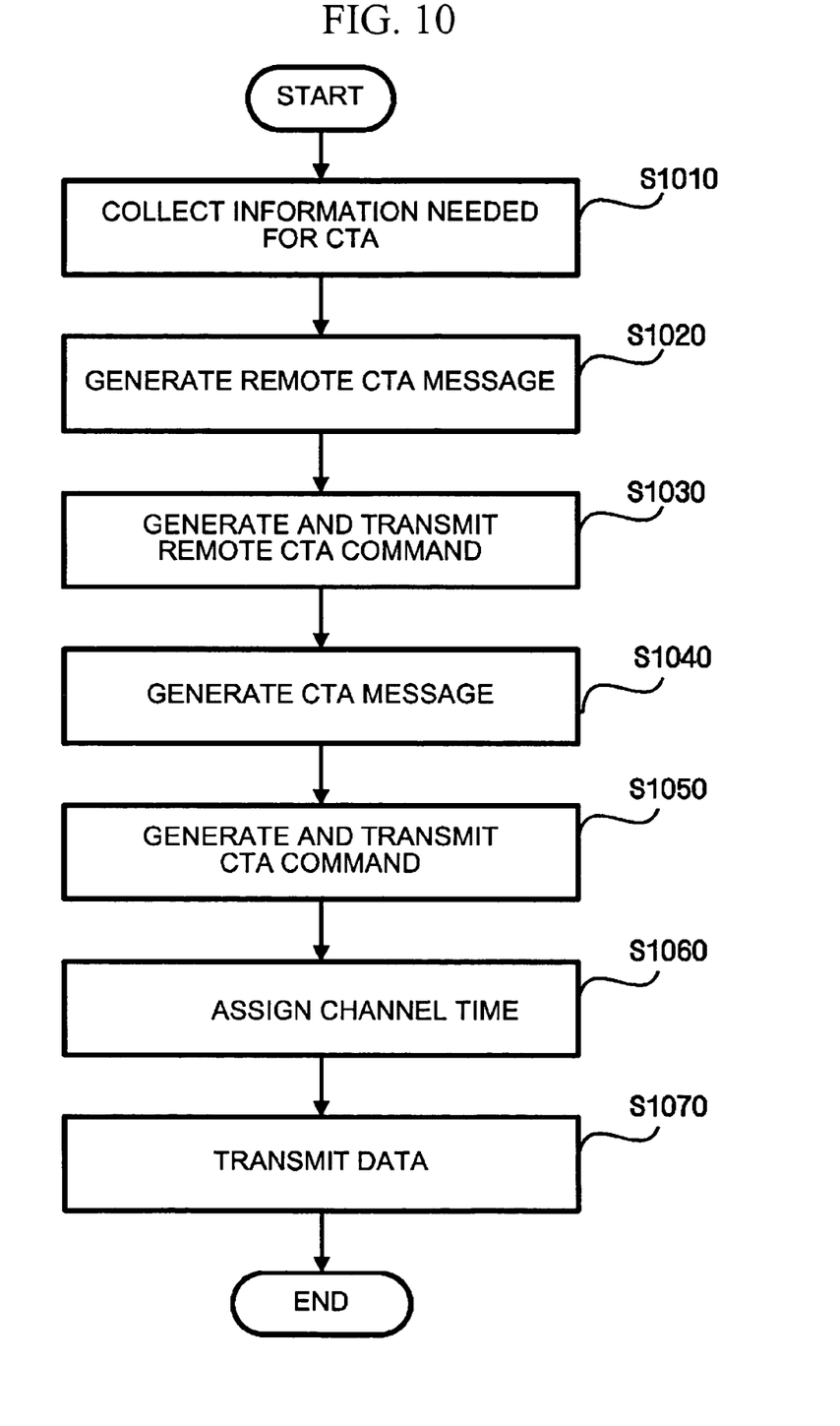
FIG. 10 is a flowchart illustrating a process that allows a target DEV to request remote CTA according to an embodiment of the present invention.

FIG. 10 is a flowchart illustrating a process that allows a target DEV to request remote CTA within a single piconet according to an embodiment of the present invention. When remote CTA is performed in a single piconet, a frame is transmitted and received between a sending DEV and a target DEV.

Referring to FIG. 10, first, in step 1010, the target DEV collects information needed for CTA. The information is used to determine channel time to be allocated. The target DEV may have the information or receive it from the sending DEV.

In step S1020, a DME of the target DEV calculates the required channel time using the information and generates a remote CTA message.

In step S1030, a MLME of the target DEV generates a remote CTA command using the remote CTA message and transmits the generated remote CTA command to the sending DEV.

In step S1040, after receiving the remote CTA command, a DME of the sending DEV generates a CTA message.

In step S1050, the MLME of the sending DEV generates a CTA command according to the CTA message and sends the generated CTA command to a PNC.

In step S1060, when a resource is available for CTA, the PNC assigns the requested channel time and broadcasts a beacon containing CTA information to all devices within the piconet.

In step S1070, after the channel time is assigned, the sending DEV transmits data to the target DEV during the assigned channel time.

Figure 11:
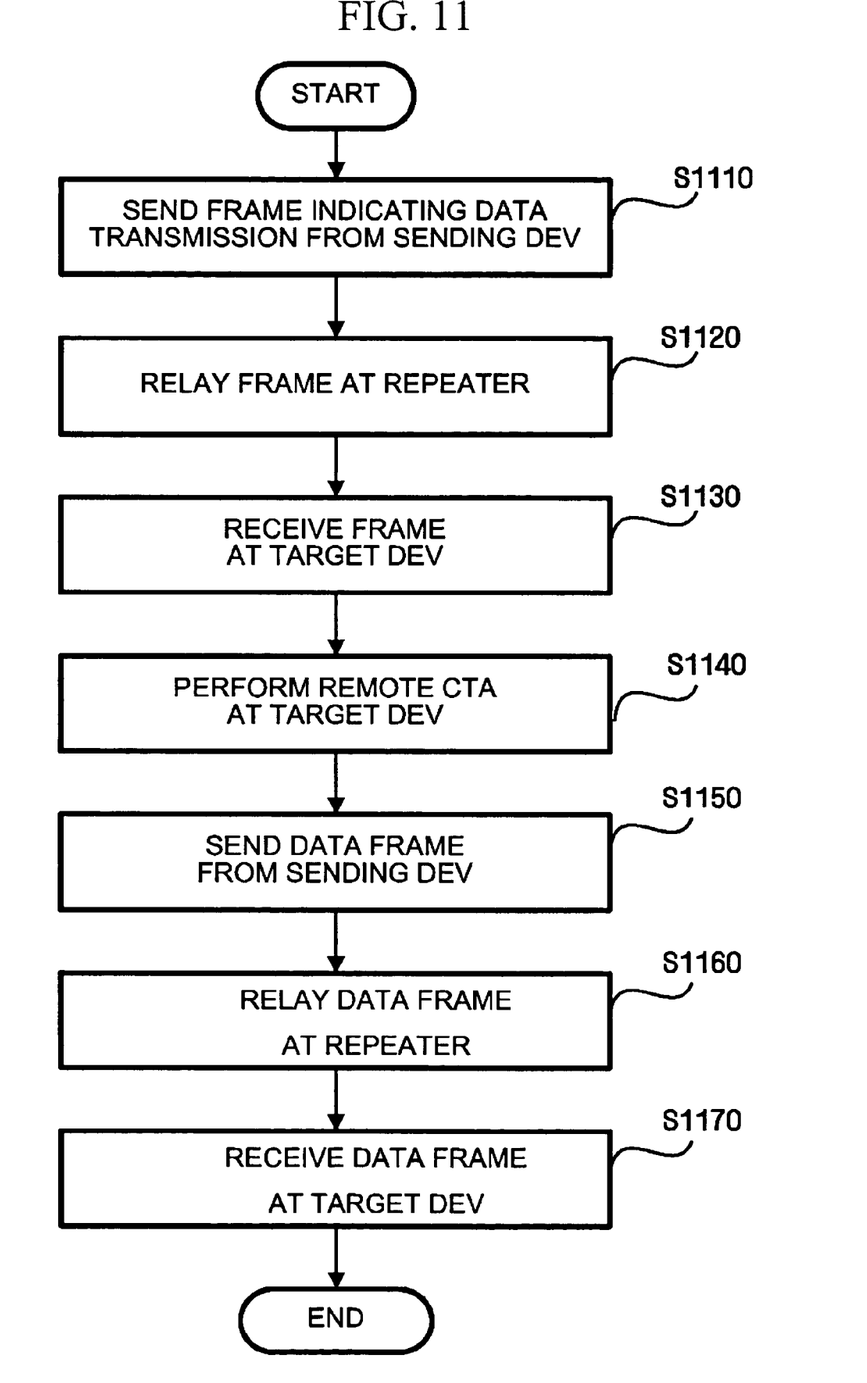
FIG. 11 is a flowchart illustrating a process of transmitting and receiving data between piconets connected through a backbone network according to an embodiment of the present invention.

FIG. 11 is a flowchart illustrating a process of transmitting and receiving data between piconets connected through a backbone network according to an embodiment of the present invention.

Referring to FIG. 11, in step S1110, a sending DEV transmits a frame indicating data transmission to a target DEV.

In step S1120, the wireless frame indicating data transmission is converted into a wired frame by a repeater connecting a piconet where the sending DEV belongs with a backbone network in order to relay the wired frame to the backbone network, and the wired frame is converted into a wireless frame by a repeater connecting a piconet where the target DEV belongs with the backbone network in order to relay the wireless frame to the target DEV.

In step S1130, the target DEV receives the frame indicating data transmission. The target DEV uses the frame indicating data transmission to obtain various information (e.g., transmission bandwidth) from a middleware or application operating at a layer overlying a MAC layer.

In step S1140, the target DEV that calculates required channel time using the frame indicating data transmission is assigned channel time for data reception using a remote CTA method.

In step S1150, the sending DEV sends a data frame after transmitting the frame indicating data transmission.

In step S1160, the repeaters respectively perform wireless-to-wired and wired-to-wireless conversion on the data frame and relay the resulting frames to the target DEV.

In step S1170, the target DEV receives data transmitted during the allocated channel time.

While the present invention has been particularly shown and described with reference to exemplary embodiments thereof, it will be understood by those of ordinary skill in the art that various changes or modifications in form and details may be made therein without departing from the spirit and scope of the present invention as defined by the following claims.

The present invention uses a remote CTA request to enable a target DEV receiving data to be assigned channel time. By applying the remote CTA request made by the target DEV to communications between different piconets connected through a backbone network, the present invention allows a receiving party to be easily assigned channel time required for data transmission.

What is claimed is:

1. A method for communication in a coordinator-based wireless network, the method comprising:
    obtaining information needed for channel time allocation (CTA) from a frame indicating data transmission received from a sending device;
    sending a remote CTA request frame to the sending device in order for the sending device to request the CTA from a coordinator within the wireless network for data transmission; and
    receiving a data frame transmitted by the sending device during channel time allocated by the coordinator.

2. The method of claim 1, wherein frames being transmitted from the wireless network are compliant with the IEEE 802.15.3 standard.

3. A method for communication in a coordinator-based wireless network, the method comprising:
    sending a frame indicating data transmission containing information needed for channel time allocation (CTA) to a target device, in order for the target device to generate a remote CTA request frame;
    receiving the remote CTA request frame from the target device;
    requesting CTA from a coordinator within the wireless network for data reception, according to the remote CTA request; and
    sending a data frame to the target device during channel time assigned by the coordinator.

4. The method of claim 3, wherein frames being transmitted from the wireless network are compliant with the IEEE 802.15.3 standard.

5. A method for communication between first and second coordinator-based wireless networks connected through a backbone network, the method comprising:
    sending a frame indicating data transmission from a sending device in the first coordinator-based wireless network to a repeater connecting the first coordinator-based wireless network with the backbone network in order for a target device within the second coordinator-based wireless network to request remote channel time allocation (CTA); and
    sending a frame to be destined for the target device from the sending device to the repeater after sending the frame indicating data transmission.

6. The method of claim 5, wherein the frame sent by the sending device is compliant with the IEEE 802.15.3 standard and contains additional information needed to be transmitted to the target device through the backbone network.

7. The method of claim 6, wherein the additional information is a unique identifier of the second coordinator-based wireless network.

8. The method of claim 6, wherein the additional information is a unique identifier of the target device.

9. A method for communication between first and second coordinator-based wireless networks connected through a backbone network, the method comprising:
    receiving a frame indicating data transmission containing information needed for remote channel time allocation (CTA) from a repeater connecting the second coordinator-based wireless network with the backbone network;
    sending a remote CTA frame in order for the repeater to request CTA from the coordinator within the second coordinator-based wireless network; and
    receiving a data frame originated from the first coordinator-based wireless network and then provided by the repeater during assigned channel time.

10. The method of claim 9, wherein the frames being transmitted from or received in the wireless network are compliant with the IEEE 802.15.3 standard.

11. A computer-readable recording storage having a computer readable program recorded therein for causing a computer to implement a method for communication in a coordinator-based wireless network, the method comprising:
    obtaining information needed for channel time allocation (CTA) from a frame indicating data transmission received from a sending device;
    sending a remote CTA request frame to the sending device in order for the sending device to request the CTA from a coordinator within the wireless network for data transmission; and
    receiving a data frame transmitted by the sending device during channel time allocated by the coordinator.

12. A computer-readable recording storage having a computer readable program recorded therein for causing a computer to implement a method for communication in a coordinator-based wireless network, the method comprising:
    sending a frame indicating data transmission containing information needed for channel time allocation (CTA) to a target device, in order for the target device to generate a remote CTA request frame;

receiving the remote CTA request frame from the target device;

requesting CTA from a coordinator within the wireless network for data reception, according to the remote CTA request; and sending a data frame to the target device during channel time assigned by the coordinator.

13. A computer-readable recording storage having a computer readable program recorded therein for causing a computer to implement a method for communication between first and second coordinator-based wireless networks connected through a backbone network, the method comprising:

sending a frame indicating data transmission from a sending device in the first coordinator-based wireless network to a repeater connecting the first coordinator-based wireless network with the backbone network in order for a target device within the second coordinator-based wireless network to request remote channel time allocation (CTA); and sending a frame to be destined for the target device from the sending device to the repeater after sending the frame indicating data transmission.

14. A computer-readable recording storage having a computer readable program recorded therein for causing a computer to implement a method for communication between first and second coordinator-based wireless networks connected through a backbone network, the method comprising:

receiving a frame indicating data transmission containing information needed for remote channel time allocation (CTA) from a repeater connecting the second coordinator-based wireless network with the backbone network;

sending a remote CTA frame in order for the repeater to request CTA from the coordinator within the second coordinator-based wireless network; and receiving a data frame originated from the first coordinator-based wireless network and then provided by the repeater during assigned channel time.

* * * * *